United States Patent [19]
Aso

[11] Patent Number: 4,864,974
[45] Date of Patent: Sep. 12, 1989

[54] COOLING APPARATUS FOR A STARTER MOTOR AND/OR A GENERATOR FOR A CAR

[75] Inventor: Hiroaki Aso, Himeji-shi, Japan

[73] Assignee: Mitsubishi Denki Kabushiki Kaisha, Tokyo, Japan

[21] Appl. No.: 171,382

[22] Filed: Mar. 21, 1988

[30] Foreign Application Priority Data

Mar. 23, 1987 [JP] Japan ................................. 62-69433
Mar. 23, 1987 [JP] Japan ................................. 62-69434

[51] Int. Cl.$^4$ ............................. F01P 3/20; F01P 7/16
[52] U.S. Cl. ................................. 123/41.31; 310/54; 310/53; 290/2
[58] Field of Search ............... 165/41; 123/41.31; 310/53, 54, 58, 68 C; 290/2, 1 A; 361/25, 26, 27

[56] References Cited

U.S. PATENT DOCUMENTS

| | | | |
|---|---|---|---|
| 1,315,996 | 9/1919 | Simmon | 310/53 |
| 2,975,308 | 3/1961 | Kilbourne et al. | 310/54 |
| 3,089,046 | 5/1963 | Jaeschke | 310/54 |
| 3,241,331 | 3/1966 | Endress et al. | 310/54 |
| 3,681,609 | 8/1972 | Boese et al. | 290/2 |
| 4,262,224 | 4/1981 | Kofink et al. | 310/54 |
| 4,500,772 | 2/1985 | Ahner et al. | 310/63 |
| 4,765,283 | 8/1988 | Kitamura et al. | 123/41.31 |

FOREIGN PATENT DOCUMENTS 0152347 7/1987 Japan ................................. 310/53
WO8501310 3/1985 World Int. Prop. O. ....... 123/41.31

Primary Examiner—John Ford
Attorney, Agent, or Firm—Oblon, Spivak, McClelland, Maier & Neustadt

[57] ABSTRACT

A cooling apparatus for electrical accessories such as a generator and a starter motor for a car comprises a cooling liquid conduit for feeding a part of a cooling liquid for cooling an engine to a starter motor for starting the engine, and/or an A.C. generator and having at least one sensor for detecting the temperature of the cooling liquid and at least one valve provided in the cooling liquid conduit so that opening and closing operations are controlled on the basis of an output from the sensor.

4 Claims, 3 Drawing Sheets

COOLING APPARATUS FOR A STARTER MOTOR AND/OR A GENERATOR FOR A CAR

DISCUSSION OF BACKGROUND

FIG. 5 is a diagram showing a conventional cooling apparatus for a starter motor used for a car engine.

In FIG. 5, a reference numeral 1 designates an engine mounted on a car, a numeral 2 designates a cylinder block constituting the engine, a numeral 3 designates a water jacket provided around the cylinder block, a numeral 4 designates an upper hose for feeding a cooling liquid warmed in the water jacket to a radiator 5, a numeral 6 designates a lower hose for feeding the cooling liquid cooled in the radiator 5 to the water jacket 3, and a numeral 7 designates a water pump interposed between the lower hose 6 and the water jacket 3 to apply a pressure to the cooling liquid to thereby forcibly circulate it.

A numeral 108 designates a starter motor for driving the engine and provided with a pinion 108a for driving the ring gear of the engine (not shown). There is a cooling liquid circulating system in which a part of the cooling liquid for cooling the engine is supplied in the yoke of the starter motor, and the cooling liquid is passed through the conduit formed in the yoke to cool the stator core and the field coil, and the cooling liquid is fed into the lower hose 6.

In the conventional apparatus having the construction as above-mentioned, a part of the cooling liquid in the engine 1 is fed from the water jacket 3 surrounding the cylinder block 2 to the cooling liquid conduit in the starter motor 108, and then, the cooling liquid flows in the conduit while the stator core and the field coil of the starter motor 108 are cooled. The cooling liquid is introduced with the lower hose 6 which forms a discharging path from the radiator 5. Since the effect of suction depending on a flow rate of the cooling liquid discharged from the radiator 5 is applied to the cooling liquid flowing through the conduit, there is obtainable good circulating condition for the cooling liquid in the conduit of the starter motor 108; thus, the stator core and the field coil are effectively cooled.

In the above-mentioned conventional cooling apparatus for the starter motor, when there takes place a fault such as breakage of the radiator with the result that the flow rate of the cooling liquid becomes small, cooling of the engine can not be sufficiently performed, whereby the temperature in the engine is increased and the temperature of the cooling liquid is abnormally elevated.

In this case, if a driver of the car doesn't become aware of the fault, the cooling liquid of a high temperature or a hot gas resulted by the evaporation of the warmed cooling liquid is supplied to the cooling liquid conduit in the starter motor 108 by the action of the water pump, whereby there occurs a serious problem of reduction in cooling effect for the stator core and the field coil. In the worst case, they are heated rather than cooled.

There is another problem. Namely, in the winter season, the cooling liquid is supplied to the cooling liquid conduit in the starter motor 108 even when the temperature of the cooling liquid in the engine 1 is abnormally low, whereby the elements to be cooled of the starter motor 108 are excessively cooled.

FIG. 6 is a diagram showing a conventional cooling apparatus for the generator used for a car. The construction as in FIG. 6 is the same as that in FIG. 5, provided that an a.c. generator 208 for a car is communicatively connected between the water jacket 3 and the lower hose 6. Accordingly, description concerning the same parts is omitted.

In the same manner as described with reference to FIG. 5, the cooling liquid is supplied from the water jacket 3 to the generator casing of the a.c. generator; is passed through the cooling liquid conduit in the casing during which the stator core and the stator coil are cooled, and is introduced into the lower hose 6. In the cooling apparatus shown in FIG. 6, there are the same problems as described with reference to FIG. 5, namely, there takes place reduction in the cooling effect due to the fault of the radiator and excessive cooling in the winter season.

SUMMARY OF THE INVENTION

It is an object of the present invention to provide a cooling apparatus for a starter motor and/or an a.c. generator for a car which is capable of controlling supply of the cooling liquid depending on the temperature of it in the engine, whereby the starter motor and/or the a.c. generator can be cooled under the optimum condition.

In a first aspect of the present invention, there is provided a cooling apparatus for a starter motor for a car which comprises a cooling liquid conduit for feeding a part of a cooling liquid for cooling an engine to a starter motor for starting the engine, a sensor for detecting the temperature of the cooling liquid and a valve provided in the cooling liquid conduit so that opening and closing operations are controlled on the basis of an output from the sensor.

In a second aspect of the present invention, there is provided a cooling apparatus for a car which a respective cooling liquid conduit to feed a part of a cooling liquid for cooling a car engine is communicatively connected to an a.c. generator for the car and a starter motor for starting the car engine.

In a third aspect of the present invention, there is provided a cooling apparatus for a car which comprises a cooling liquid conduit to feed a part of a cooling liquid for cooling a car engine is communicatively connected to an a.c. generator for the car and a starter motor for starting the car engine, a sensor provided in the cooling liquid conduit and a valve provided in the cooling liquid conduit so that opening and closing operations are controlled on the basis of an output from the sensor.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DETAILED DESCRIPTION OF PREFERRED EMBODIMENT

Figure 1:
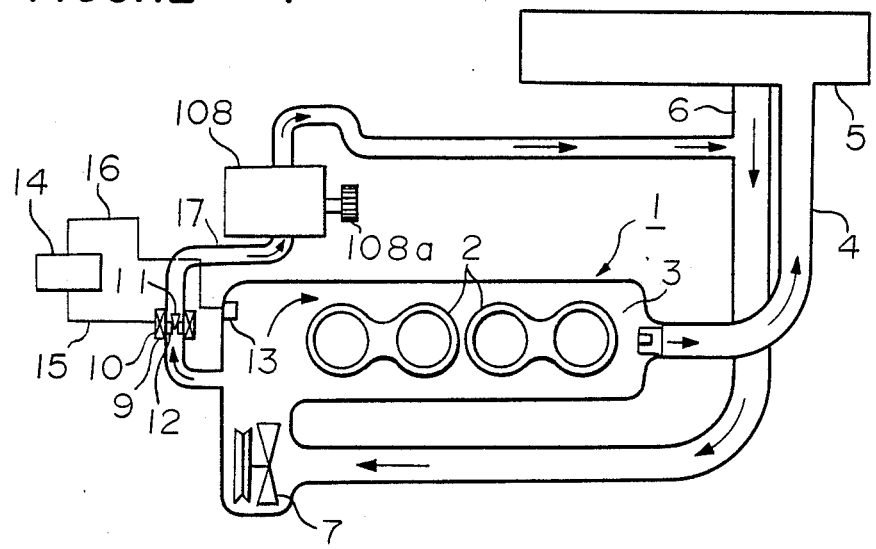
FIG. 1 is a diagram showing an first embodiment of the cooling apparatus according to the present invention.

Referring now to the drawings, wherein the same reference numerals designate the same or corresponding parts throughout the several views, and more particularly to FIG. 1 thereof, there is shown a diagram of a first embodiment of the cooling apparatus of the present invention. In FIG. 1, an electromagnetic valve 9 is provided in a hose 17 which communicates the water jacket 3 of the car engine 1 with the cooling liquid conduit in the starter motor 108 to supply the cooling liquid thereto. The electromagnetic valve 9 comprises an exciting coil 10, a movable valve 11 and a valve seat 12. A sensor 13 is attached on or in the water jacket to detect the temperature of the cooling liquid in the water jacket 13. An output from the sensor 13 is supplied to a controlling device 14 through a connecting line 16. A connecting line 15 connects the controlling device 14 to the exciting coil 10. The output signal of the sensor 13 is compared with a preset value in the controlling device 14, and when the output of the sensor 13 reaches a predetermined level, the controlling device 14 generates a signal to the electromagnetic valve 9, whereby the exciting coil 10 is actuated to close the valve 9. In the embodiment of the present invention having the above-mentioned construction, when the radiator 5 for the engine 1 becomes faulty, and an amount of the cooling liquid to be circulated becomes small with the consequence that the temperature of the engine 1 is increased or the temperature of the cooling liquid becomes abnormally high (about 100° C.), the sensor 13 detects such temperature of the cooling liquid to output a signal to the controlling device 14 through the connecting line 16. The controlling device 14 compares the electric signal from the sensor 13 and gives an instruction to feed a current to the exciting coil 10 through the connecting line 15. Accordingly, the movable valve 11 is attracted by an electromagnetic force to the valve seat 12 to close the valve. Accordingly, supply of the cooling liquid is blocked by the valve 9 and any hot cooling liquid or hot gas can not be fed to the cooling liquid conduit in the starter motor 1, whereby an abnormal temperature rise in the elements to be cooled such as the stator core, the field coil is avoidable.

In the above-mentioned embodiment, the electromagnetic valve 9 is provided in the intermediate portion of the hose 17 which communicates the water jacket 3 with the starter motor 108. However, the same effect can be obtained by providing the electromagnetic valve 9 at the inlet for the cooling liquid in the starter motor 108, or at the outlet of the water jacket 3.

In the above-mentioned embodiment, description has been made as to the case that supply of the cooling liquid to the starter motor 108 is blocked when the temperature of the cooling liquid in the water jacket 3 becomes abnormally high. However, the supply of the cooling liquid to the starter motor 108 may also be blocked when the temperature of the cooling liquid in the water jacket 3 is abnormally low. In this case, the disadvantage of excessively cooling the elements of the starter motor 108 can be eliminated.

The present invention is applicable to a permanent magnet type starter motor other than the coil type starter motor described above.

Thus, in the above-mentioned embodiment of the present invention, the sensor is provided on or in the water jacket to detect the temperature of the cooling liquid in the engine and a valve is provided in the hose to control supply of the cooling liquid to the starter motor on the basis of an output from the sensor. Accordingly, supply of the cooling liquid to the starter motor can be controlled depending on the temperature of the cooling liquid in the engine, whereby the problems of reduction in cooling effect to the elements to be cooled of the starter motor and the excessively cooling or abnormally heating of the elements can be avoided.

Similarly, it is apparent that the supply of the cooling liquid to an a.c. generator for a car can be controlled on the basis of the temperature of the cooling liquid in the engine by providing an electromagnetic valve in a hose to feed a part of the cooling liquid to the a.c. generator so as to control the supply of the cooling liquid on the basis of the output of the sensor.

Figure 2:
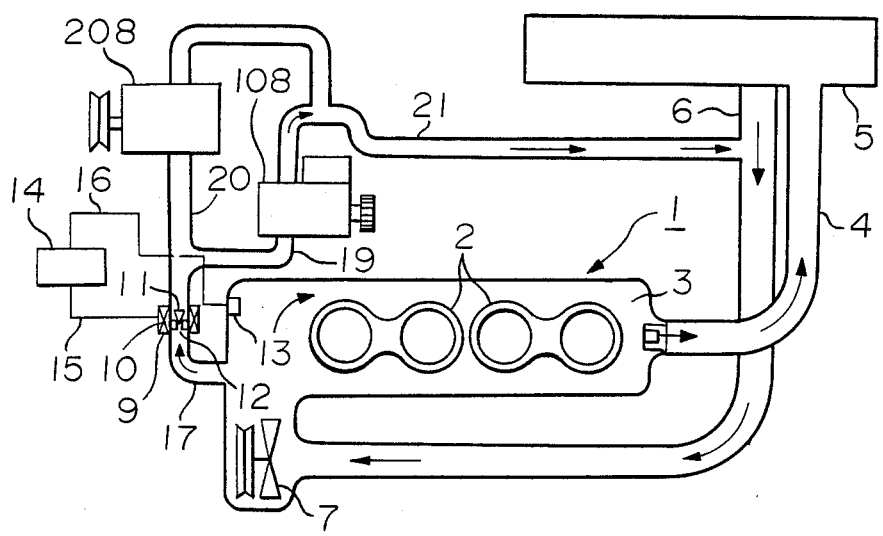
FIG. 2 is a diagram showing a second embodiment of the present invention.

FIG. 2 is a diagram showing a second embodiment of the present invention. In FIG. 2, numerals 1–7, 9, 13, 14, 15 and 16 designate the same parts as in FIG. 1, and therefore, description of these parts is omitted.

The cooling liquid from the water jacket 3 is supplied to the starter motor 108 through the first hose 17 and the third hose 20, and the second hose 19 branched from the first hose 17. The cooling liquid supplied to the starter motor 108 cools the elements to be cooled such as the stator coil, the stator core etc. On the other hand, a part of the cooling liquid is supplied to the a.c. generator 208 through the first hose 17 and the third hose 20 to cool the stator core and field coil of the a.c. generator. The first flow of the cooling liquid passing through the starter motor and the second flow of the cooling liquid passing through the a.c. generator 208 are joined in the fourth hose 21 and is merged with the cooling liquid in the lower hose 6.

In the second embodiment of the present invention, when the radiator 5 and the water pump 7 are normally operated, and the temperature of the cooling liquid is lower than a predetermined value (about 80° C.), the sensor 13 provided on or in the water jacket 3 detects the temperature of the cooling liquid and outputs a signal to the controlling device 14 through the connecting line 16. The controlling device 14 receives the output signal of the sensor 13 to compare the value of the output signal with a predetermined value held therein. When the output of the sensor 13 does not reach the predetermined value, no signal is produced from the controlling device 14 to the exciting coil 10 through the connecting line 15. Accordingly, the electromagnetic valve 9 is in an open state, whereby the cooling liquid in the engine 1 is respectively supplied to the starter motor 108 and the a.c. generator 208 through the first to third hoses 17, 19, 20 and the electromagnetic valve 9, whereby the stator coil, the stator core and so on are effectively cooled. The cooling liquid passed through the starter motor 108 and the generator 208 is returned to the radiator side through the fourth hose 21. In case that the radiator 5 is damaged and an amount of the cooling liquid to be supplied to the engine 1 becomes small, whereby the temperature of the engine is increased and the temperature of the cooling liquid is abnormally increased (nearly 100° C.), the sensor 13 detects the temperature of the cooling liquid and outputs a signal to the controlling device 14 through the connecting line 16. As a result of comparison of the output signal from the sensor with a predetermined value held in the controlling device 14, the controlling device 14 provides an instruction of actuation to the exciting coil 10 through the connecting line 15. When the exciting coil 10 is actuated, the movable valve 11 is attracted to the valve seat 12 by an electromagnetic force whereby the movable valve 11 is kept under the condition for closing the electromagnetic valve 9. Accordingly, the supply of the cooling liquid is blocked by the valve 9, and there is no flow of the cooling liquid having a high temperature or a hot gas to the generator 208 and the starter motor 108. Thus, temperature rise in the elements to be cooled such as the stator core, the stator coil and so on is avoidable.

Figure 3:
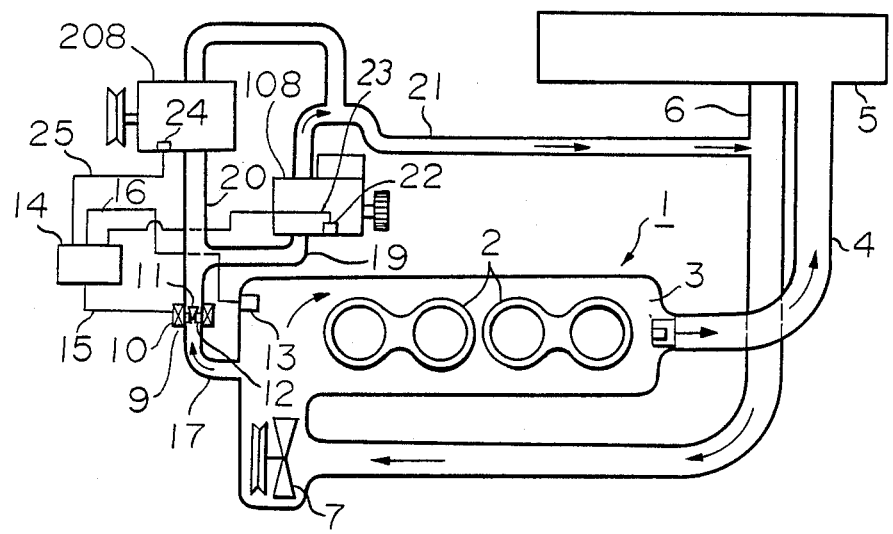
FIG. 3 is a diagram showing a third embodiment of the present invention.

FIG. 3 shows a third embodiment of the cooling apparatus according to the present invention.

In FIG. 3, in addition to the sensor 13 to detect the temperature of the cooling liquid in the water jacket, a second sensor 22 is provided in or on the starter motor 108 to detect the temperature of the starter motor, and a third sensor 24 is provided in or on the a.c. generator 208. The outputs of the second and third sensors are supplied to the controlling device 14 through the respective connecting lines 23, 25.

In the cooling apparatus in which the a.c. generator 208 and the starter motor 108 are cooled by circulating a part of the cooling liquid for cooling the engine, there occurs the problem that even though the temperature of the cooling liquid in the water jacket 3 does not reach the predetermined value, the temperature of the cooling liquid may cause a trouble to the starter motor 108 and the a.c. generator 208 from the standpoint of their operational characteristics. The third embodiment as shown in FIG. 3 can deal with such difficulties, and it blocks the supply of the cooling liquid to the starter motor 108 and the generator 208 by closing the electromagnetic valve 9.

A fourth embodiment of the present invention will be described with reference to FIG. 4. In the fourth embodiment, the second and third hoses 19, 20 are respectively provided with an electromagnetic valve to control the flow of the cooling liquid in place of the electromagnetic valve 9 placed in the first hose 17.

Figure 4:
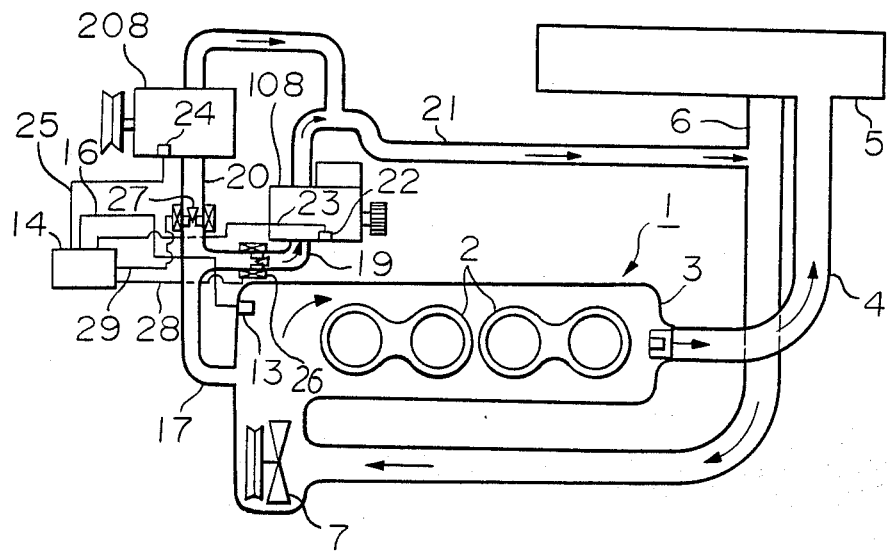
FIG. 4 is a diagram showing a fourth embodiment of the present invention.
Figure 5:
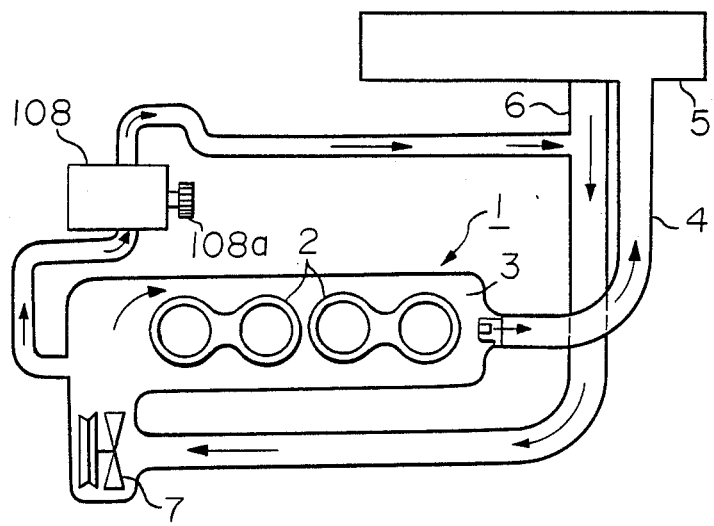
FIG. 5 is a diagram showing a conventional cooling apparatus.
Figure 6:
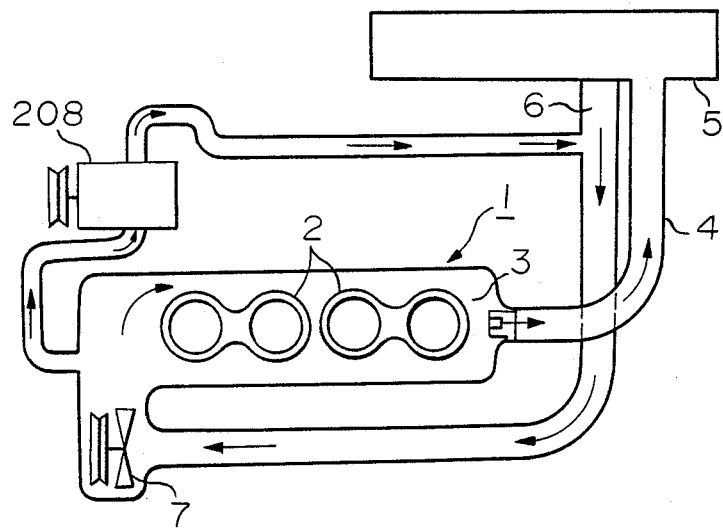
FIG. 6 is a diagram showing another conventional cooling apparatus.

In FIG. 4, a reference numeral 26 designates a first electromagnetic valve provided in the second hose 19 for feeding the cooling liquid to the starter motor 108. The first electromagnetic valve 26 is controlled by the sensor 22 in or on the starter motor 108, the sensor 13 in or on the water jacket 3 and the sensor 24 in or on the generator 208.

A numeral 27 designates a second electromagnetic valve provided in the third hose 20 for supplying the cooling liquid to the a.c. generator 208. The second electromagnetic valve 27 is controlled by the same sensors as mentioned with respect to the first electromagnetic valve 26. A reference numeral 28 designates a connecting line for connecting the first electromagnetic valve 26 to the controlling device 14, and a numeral 29 designates a connecting line for connecting the exciting coil of the second electromagnetic valve 27 to the controlling device 14.

In the embodiment shown in FIG. 4, control can be made as to the cooling liquid flowing separately in the starter motor 108 and the a.c. generator 208. Accordingly, the operational characteristics for the motor and the generator can be further improved.

In the embodiments as shown in FIGS. 2–4, description has been made as to the case that when the temperature of the cooling liquid in the water jacket, the temperature of the starter motor 108 or the temperature of the a.c. generator 208 is increased, supply of the cooling liquid to the generator 208 or the starter motor 108 can be blocked. However, the embodiments of the present invention are applicable to the case that when the temperature of the cooling liquid in the water jacket 3 or the temperature of the starter motor 108 or the a.c. generator 208 is abnormally low. In this case, the excessively cooling of the elements to be cooled of the a.c. generator 208 or the starter motor 108 can be prevented by blocking the supply of the cooling liquid to the generator 208 or the starter motor 108.

Thus, in accordance with the embodiments shown in FIGS. 2-4, a part of the cooling liquid circulating in the car engine is supplied to the a.c. generator and the starter motor to cool them, whereby excellent operational characteristics for the generator and the starter motor can be obtained.

Further, in the above-mentioned embodiments, the supply of the cooling liquid to the a.c. generator and/or the starter motor can be controlled depending on the temperature of the cooling liquid by providing the sensors to detect the temperature of the car engine, the a.c. generator and the starter motor, and at least one electromagnetic valve to control the cooling liquid depending on the output of the sensor. Accordingly, excessive heating or cooling, or reduction of the cooling effect for the parts of the a.c. generator and the starter motor can be prevented.

Obviously, numerous modifications and variations of the present invention are possible in light of the above teachings. It is therefore to be understood that within the scope of the appended claims, the invention may be practiced otherwise than as specifically described herein.

What is claimed is:

1. In a vehicle engine having cooling liquid means for cooling the engine and at least one electrical heat generating engine accessory, means for cooling said electrical accessory, comprising:

a cooling liquid conduit forming a part of said engine cooling means, said cooling liquid conduit communicating a cooling liquid in the engine with said electrical accessory;

means for pumping the cooling liquid through said cooling liquid conduit from the engine to the electrical accessory;

an electromagnetic valve positioned along a flow path of the cooling liquid from the engine to the electrical accessory along said cooling liquid conduit and actuatable for closing said flow path;

a first temperature sensor in said engine for sensing a temperature of the cooling liquid in said engine;

a second temperature sensor in said electrical accessory for sensing a temperature of the cooling liquid in the electrical accessory; and control means responsive to said first and second temperature sensors for selectively actuating said electromagnetic valve, for terminating the flow of cooling liquid to said electrical accessory in response to either of said first and second temperature sensors.

2. The engine of claim 1 including two of the electrical accessories and one of second temperature sensors in each of said electrical accessories, wherein said cooling liquid conduit has a separate branch for each of the electrical accessories.

3. The engine of claim 2 including two electromagnetic valves, one of said electromagnetic valves positioned in each of said branches.

4. The engine of claim 2 wherein said electrical accessories comprise an a.c. generator and a starter motor.

* * * * *